United States Patent [19]

del Castillo

[11] 3,996,833

[45] Dec. 14, 1976

[54] OPTICAL METRONOME

[76] Inventor: Juan M. del Castillo, Risco No. 119, Mexico City 20, Mexico

[22] Filed: July 8, 1975

[21] Appl. No.: 594,092

[52] U.S. Cl. .............................................. 84/484
[51] Int. Cl.² ....................................... G10B 15/00
[58] Field of Search ............ 84/484, 470, 483, 485, 84/478; 58/130 E

[56] References Cited

UNITED STATES PATENTS

| | | | |
|---|---|---|---|
| 3,743,758 | 7/1973 | Castillo | 84/484 |
| 3,808,349 | 4/1974 | Baba et al. | 84/484 |
| 3,818,693 | 6/1974 | Allard | 84/484 |
| 3,905,269 | 9/1975 | Doerksen et al. | 84/484 |

Primary Examiner—Stephen J. Tomsky
Attorney, Agent, or Firm—Karl W. Flocks

[57] ABSTRACT

Optical metronomes with a spot or column of light shining through the sheet of music simultaneously in all staves or alternatively in all measures utilizing individual lamps, fiber optics, or lamps located in reflecting channels. Lights illuminate successively and are controlled by motor-driven perforated shields, contact arms, or an oscillator and gating circuitry.

17 Claims, 15 Drawing Figures

OPTICAL METRONOME

BACKGROUND OF THE INVENTION

The present invention relates to optical metronomes and more particularly to visual means of helping a person, when playing an instrument, to allow proper timing in accordance with the musical notation.

The devices of the present invention differ from prior art devices by their dynamic system of illumination and by their combination of means to provide visual indication of the note on the musical notation which is to be played and the duration of time that it is to be held.

SUMMARY OF THE INVENTION

The present invention allows the person playing an instrument to observe a sheet of music of similar form to the sheet of music he would later use without aids when he becomes more skilled, and to be shown the note to be played and its duration.

With the present invention lighting means illuminates a sheet of music from behind simultaneously at least in all parallel staves or alternatively in all measures, thus considerably shortening the time of waiting to continue playing if stopped by a mistake or falling behind. With the simultaneous showing of a lighted portion in each measure, playing can be continued after a hesitation of less time than the time required for one measure.

Lighting is carried on through use of fiber optics with light to the input ends of the fibers determined by perforated, aligned shields mounted for timed rotation relative to the music being played.

Another embodiment provides lighting through individual lamps connected by a rotating contact similarly mounted for timed rotation.

Still another embodiment provides the timing through use of an oscillator connected through gating means to individual lamps.

In order to allow the simultaneous lighting of notes on several staves without multiple use of lamps or fiber circuits use can be made of lamps in combination with a vertically positioned reflecting channel for each lamp.

Furthermore, the sheet of music must be of a thickness to allow the lighting to be seen therethrough and of a size with number of measures on each line to allow lighting for each note on the sheet.

BRIEF DESCRIPTION OF THE DRAWINGS

A complete understanding of the invention may be had from the following description of particular embodiments of the invention. In the description, reference is made to the accompanying drawings of which

DESCRIPTION OF THE PREFERRED EMBODIMENTS

Figure 1:
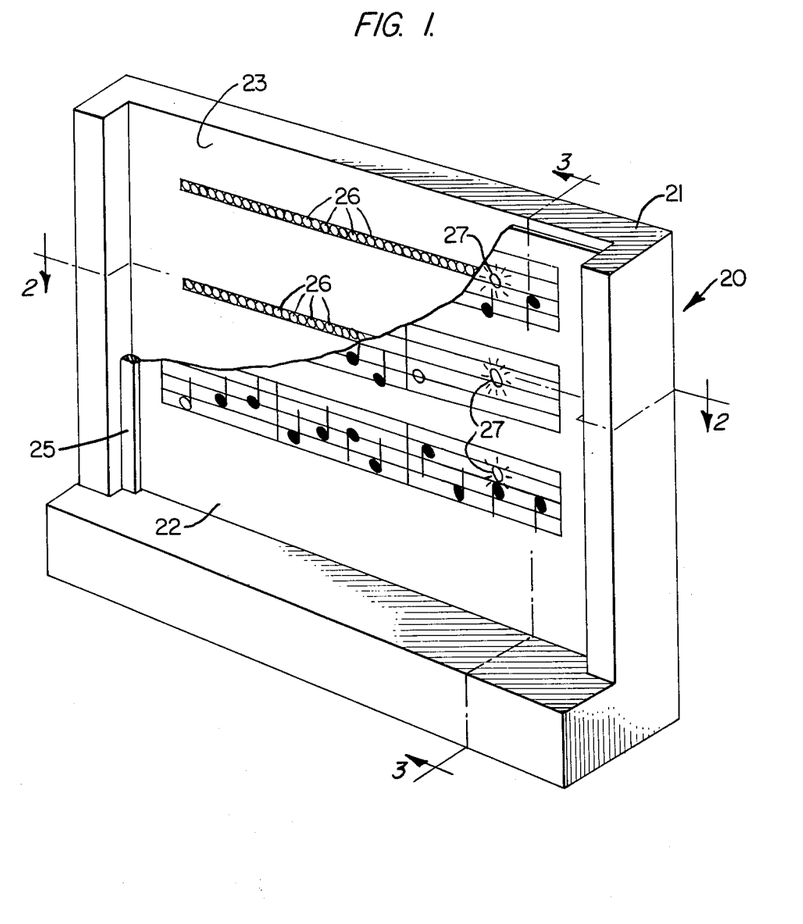
FIG. 1 is a perspective of an optical metronome of the present invention with a portion of a sheet of music removed to show construction therebeneath.
Figure 2:
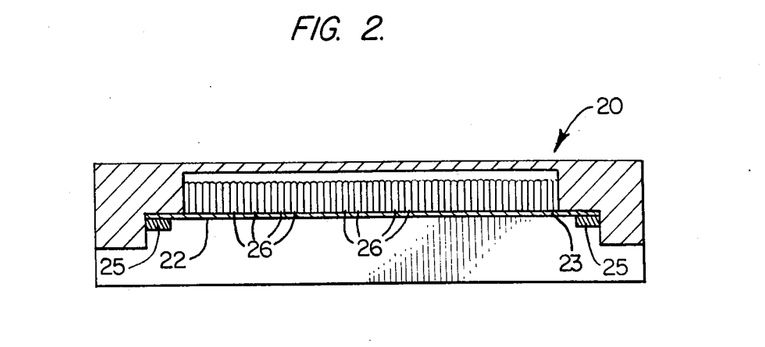
FIG. 2 is a sectional plan view along lines 2—2 of FIG. 1.

Referring first to FIG. 1 there is shown an optical metronome 20 which is placed so as to stand in a convenient position for viewing by the player of a musical instrument. Optical metronome 20 is encased in metronome case 21 with a sheet of music 22 held over the front face 23 of the metronome case 21 and being of sufficient thinness as to have at least translucent characteristics. As further shown in FIGS. 2 and 3, a plurality of optical fibers 24 are located with their upper fiber ends 26 extending through front face 23 of metronome case 21 in horizontal lines located so as to be behind the staff drawn on music sheet 22 and positioned so as to form spots of light or luminosity 27 at different note positions on sheet music 22. Luminosity herein refers to luminance which is the state or quality of radiating or reflecting light.

In the embodiment shown in FIG. 1 simultaneous luminosity 27 is spotlighted in each of the staves as the spots of light 27 move in a horizontal direction from left to right on all of the staves simultaneously. This movement of light spots 27 is controlled by the apparatus depicted in bracket A on FIG. 3 and shown in enlarged exploded form in FIG. 4. A motor 31 of controllable speed for setting to the time of the music rotates its shaft 32 and screen disc 33 having perforations 34 sufficient in number at least to equal the number of staves on sheet of music 22. Above and adjacent to screen disc 33 is plate 35 with perforations 36 therethrough into which are mounted the lower ends of optical fibers 24. A light source 37 is mounted beneath screen disc 33 so as to be adjacent to perforations 34 and is connected in a manner not shown. Perforations 34 thus allow light from light source 37 to pass through the perforations 36 in plate 35 and into the ends of optical fibers 24 mounted in each of perforations 36. As is common with optical fibers the light travels through optical fibers 24 to optical fiber ends 26 and causes the luminosity 27. As noted there are sufficient perforations 34 so as to allow that number of optical fibers 24 to carry light to a similar number of optical fiber ends 26 to allow the simultaneous appearance of spots of light 27 in each of the staves on the sheet of music 22.

Figure 5:
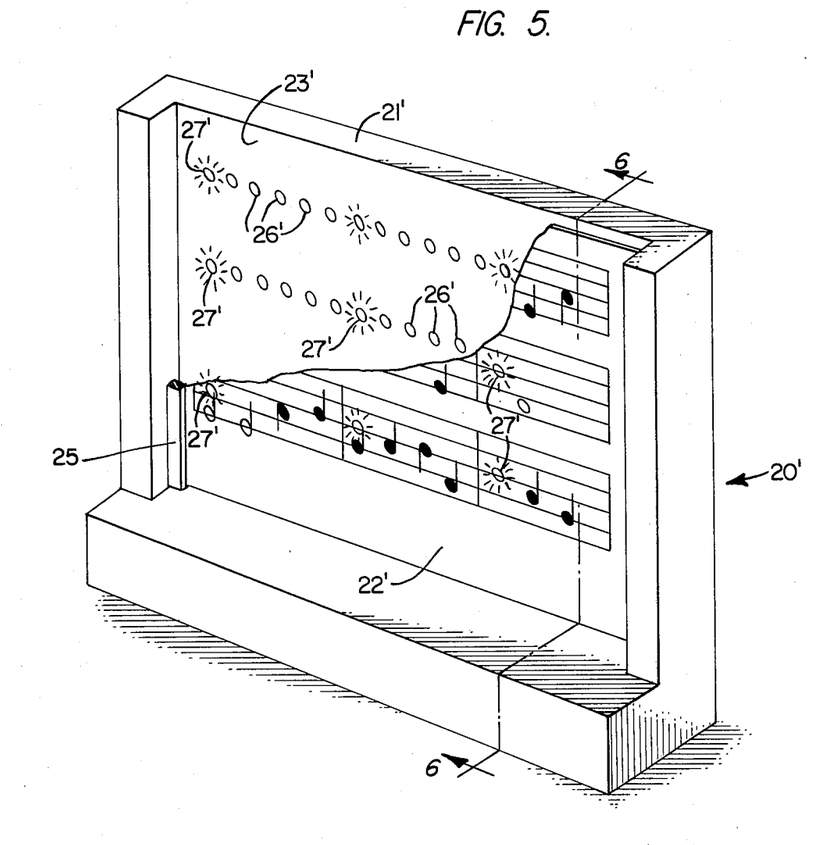
FIG. 5 is a perspective of a modified form of the optical metronome of the present invention with a portion of a sheet of music removed to show construction therebeneath.

Additional perforations 34 may be used in screen disc 33 in order to allow luminosity 27 not only to appear simultaneously in each staff but also in an alternative form of the invention to appear simultaneously in each measure so as greatly to decrease the amount of time required for the player of an instrument again to pick up his position on the sheet of music 22 if he has lost his place either by mistake or other reasons. An illustration of the use of additional points of luminosity 27' is shown in the perspective diagram of optical metronome 20' in FIG. 5. In this illustration, sheet of music 22' is held over the front face 23' of metronome case 21; where fiber ends 26' extend through metronome case 21; and are aligned horizontally behind the respective staves drawn on sheet of music 22'.

Figure 3:
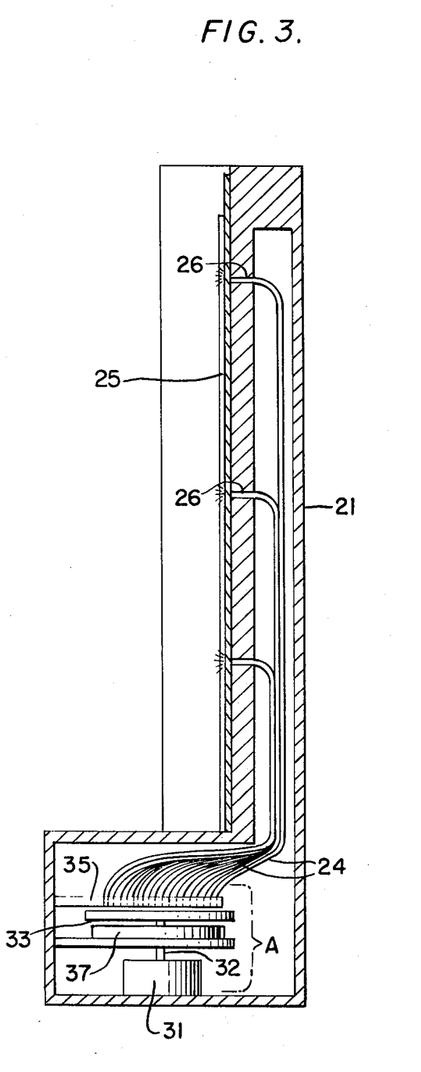
FIG. 3 is a sectional elevational view along lines 3—3 of FIG. 1.
Figure 4:
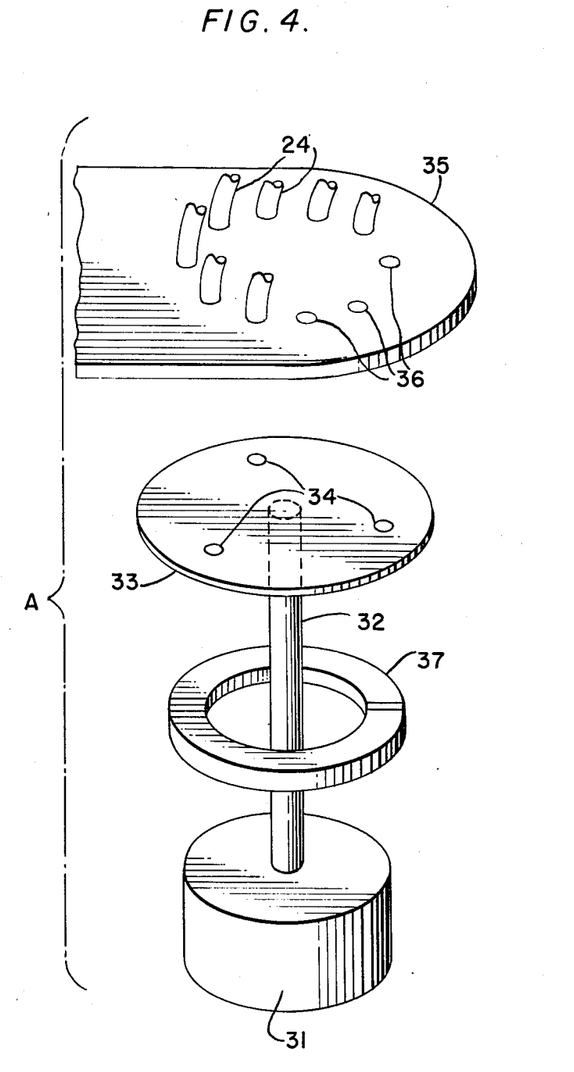
FIG. 4 is an enlarged exploded view of the portion A shown by the bracket in FIG. 3.
Figure 6:
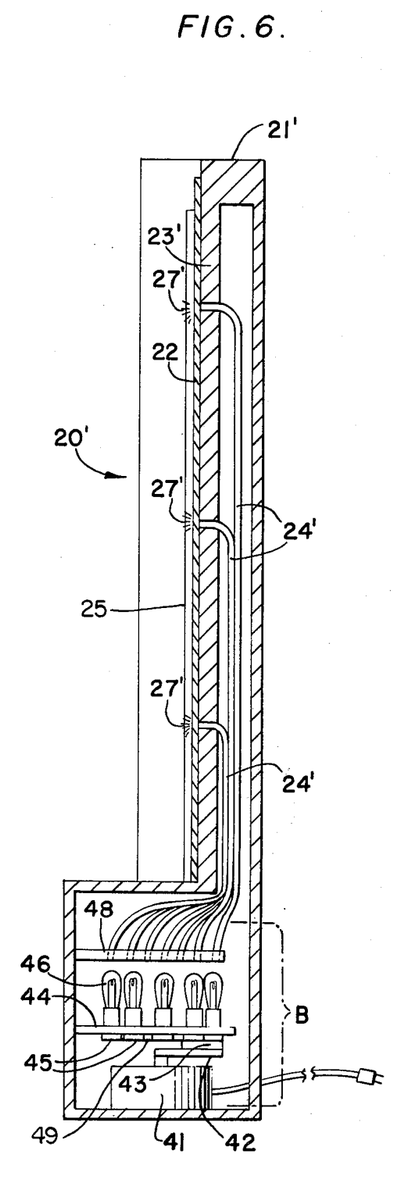
FIG. 6 is a sectional elevational view along lines 6—6 of FIG. 5.
Figure 7:
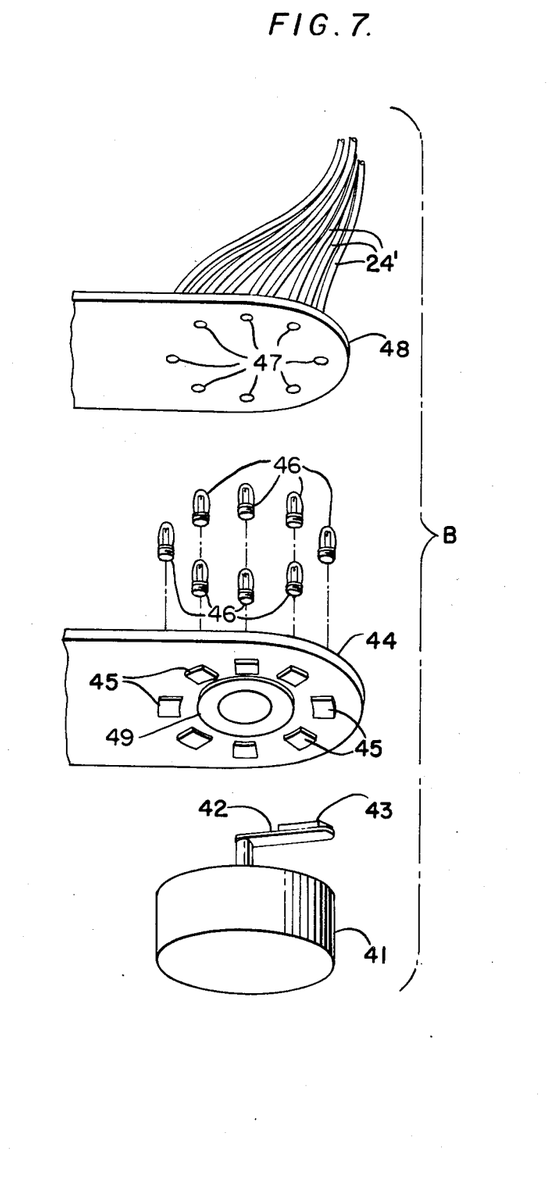
FIG. 7 is an enlarged exploded view of the portion B shown by the bracket in FIG. 6.

Although the movement of luminosity 27' at fiber ends 26' may be controlled as previously shown in FIGS. 3 and 4, it may also be accomplished as shown by the mechanism in bracket B in FIGS. 6 and 7. In this mechanism a controllable speed motor 41 has a rotating arm 42 mounted on its shaft and an electrical contact 43 mounted on the outer end of rotating arm 42 and connected electrically through said rotating arm. An isolating plate 44 is mounted above and adjacent to rotating arm 42 with contact sections 45 mounted in isolating plate 44 in a circle so as to be contacted in succession by electrical contact 43 during the rotation of rotating arm 42. On the opposite side of isolating plate 44 from rotating arm 42 and in electrical contact with contact sections 45 are lamps 46 with there being one lamp 46 for each perforation 47 in plate 48 wherein are connected optical fibers 24'. Since, as shown, there are eight perforations 47 in plate 48 and in FIG. 5 there are eight fiber ends 26' for each measure of each staff on sheet of music 22', there must be a plurality of optical fibers 24' with their ends connected in each of perforations 47 sufficient to equal the number of measures found on sheet of music 22'.

Figure 8:
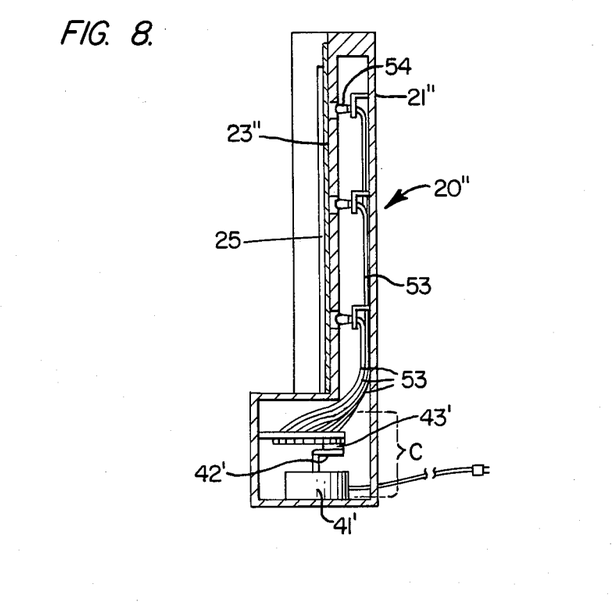
FIG. 8 is a sectional elevational view of another embodiment of the optical metronome of FIG. 1 taken along lines 3—3.
Figure 9:
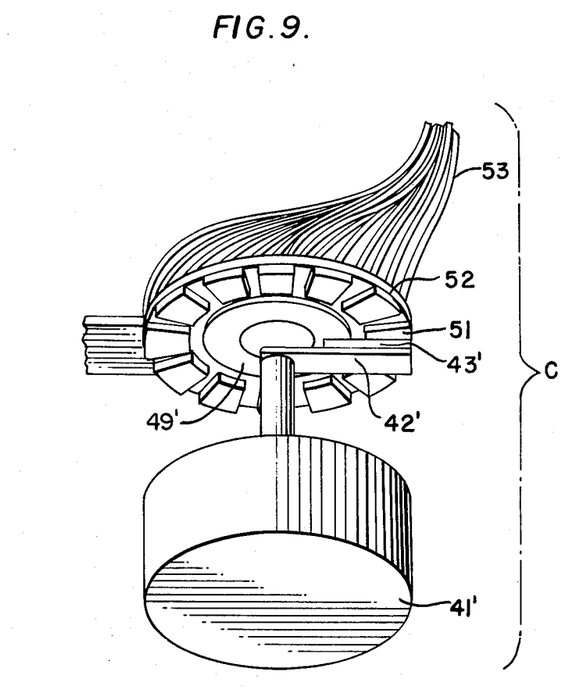
FIG. 9 is an enlarged perspective view of the motor control section of the present invention in the portion C included in brackets in FIGS. 8 and 13.

Instead of optical fibers, a system utilizing wire and lamps may also be used with this present invention to obtain a similar effect. In FIG. 8 optical metronome 20'' which may have an outward appearance as shown in either of the perspective views of FIG. 1 or FIG. 5 utilizes a control mechanism shown by bracket C in FIGS. 8 and 9, wherein controllable speed motor 41' has rotating arm 42' connected to its shaft with electrical contact 43' mounted on its outer end. Electrical contact 43' during its movement contacts in turn each of contact sections 51 which are mounted on isolating plate 52. Since wire connectors 53 are used instead of optical fiber elements these wires are connected so as to make electrical contact with sections 51. At the opposite ends of wire connectors 53 are located lamps 54, one for each wire connector 53, with these lamps located so as to protrude through front face 23'' of metronome case 21''. In order to have simultaneous luminosity behind each staff or alternatively behind each measure a plurality of wire connectors 53 must be connected to each of the contact sections 51 equal to the number of lamps which are lighted simultaneously.

Figure 10:
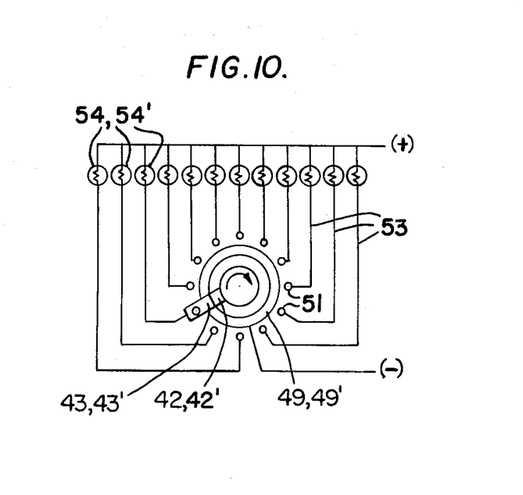
FIG. 10 is an example of a lamp connected circuit used with the control in FIG. 9.
Figure 11:
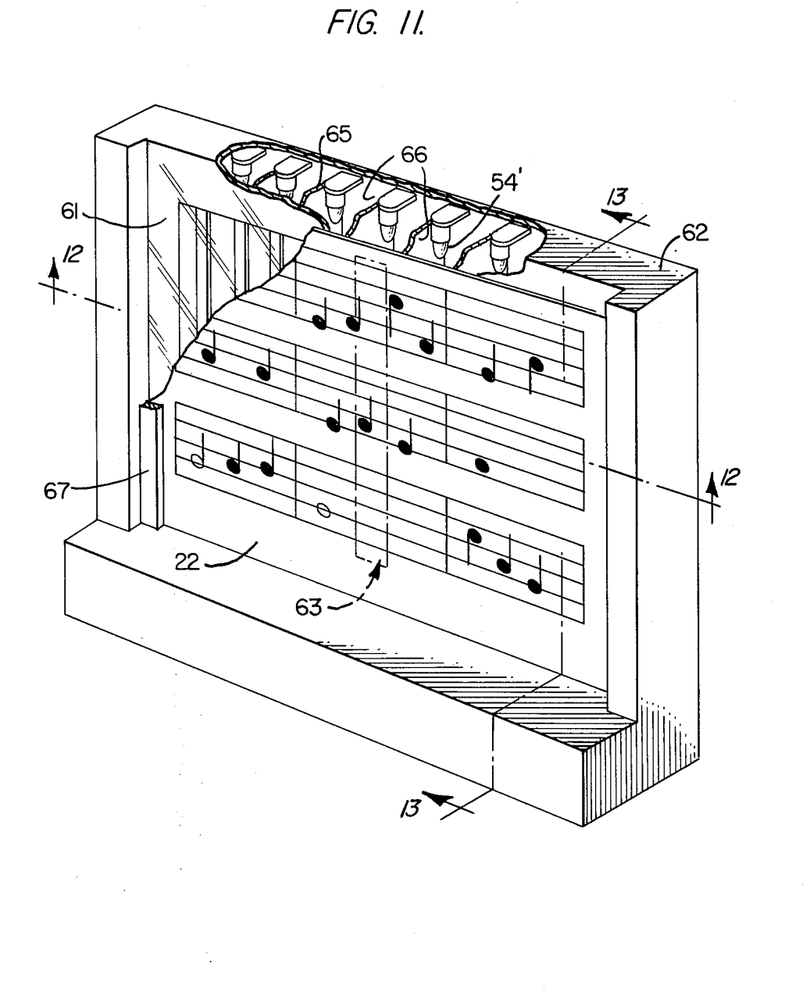
FIG. 11 is a partially broken away perspective view of another embodiment of the optical metronome of the present invention.
Figure 12:
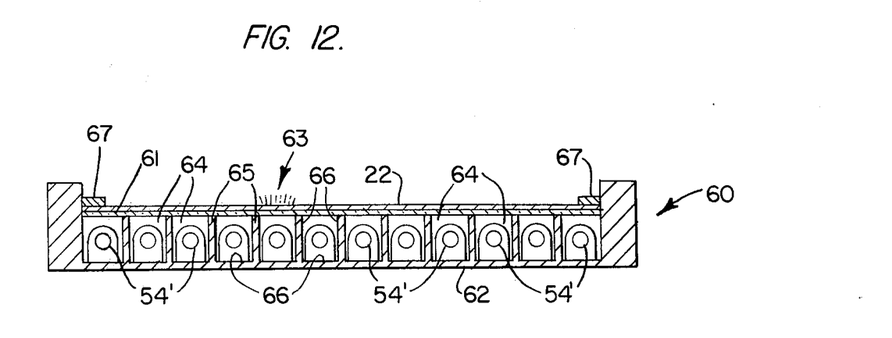
FIG. 12 is a sectional plan view along lines 12—12 of FIG. 11.
Figure 13:
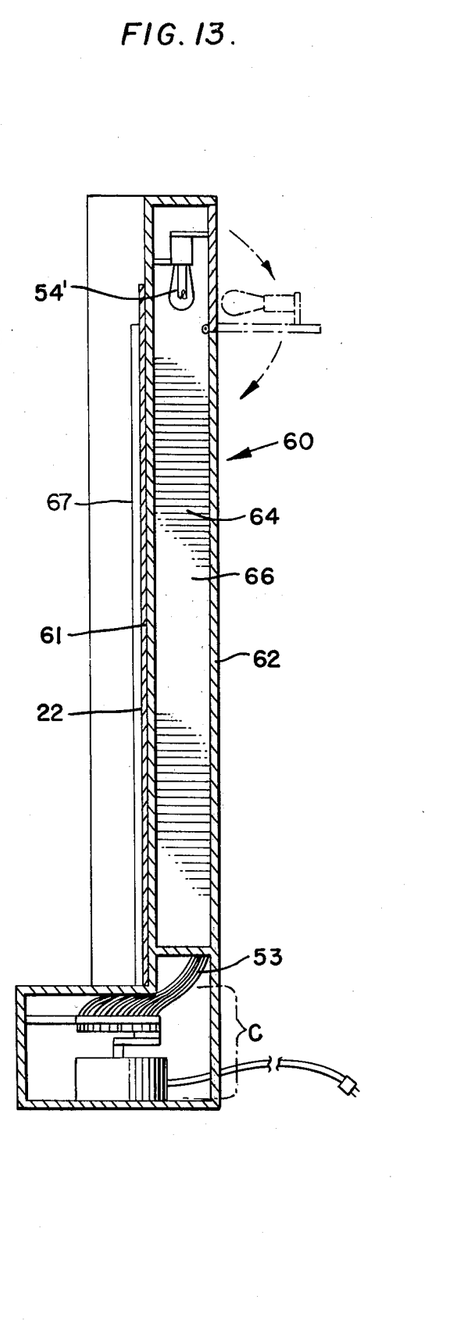
FIG. 13 is a sectional elevational view along lines 13—13 of FIG. 11.

The electrical circuitry for metronome 20' shown in FIG. 8 and also for the optical metronome 60 shown in FIGS. 11 through 13 is as shown in FIG. 10. The electrical connection from a power source passes through a lamp 54 or 54' or several lamps 54 in parallel (not shown), to one of the contact sections 51 and then through electrical contact 43 or 43', to ring conducting surface 49 or 49', which completes the circuit to ground or the power source.

In the embodiment of FIGS. 11, 12, and 13, the electrical circuitry of FIG. 10 can be used as shown without the need of connecting a plurality of lamps in order to get simultaneous luminosity behind all of the staves on a sheet of music 22.

Sheet of music 22 is held over a transparent face 61 which forms the front face of metronome case 62. The luminosity 63 from behind sheet of music 22 is in the form of a column which is formed by channels 64 having opaque backs and opaque side walls 65 extending outward from the opaque back of metronome case 62. These opaque backs and side walls are lined with reflecting material 66 or alternatively the backs and side walls may be of opaque reflecting material. Positioned above each channel 64, or if desired at the bottom of each of channels 64, is a lamp 54' connected to wire connectors 53 and operated as discussed previously, except that in this case a single lamp causes a column of luminosity 63 due to the reflection of reflecting material 66 along a channel 64 which has been lighted by the lamp 54'. For easy replacement a hinged arrangement may be made for swinging lamp 54' outward of metronome case 62 as shown in dotted outline in FIG. 13. Also in order to obtain simultaneous luminosity in all measures as discussed previously, a lamp 54' from each of the columns of each of the measures, from three lamps 54', in the specific case illustrated in FIG. 11, may be connected to each of contact sections 51. In this manner at each position of rotating arm 42 several lamps 54' will be lit thereby lighting a channel passing behind all of the measures.

Figures 14, 15:
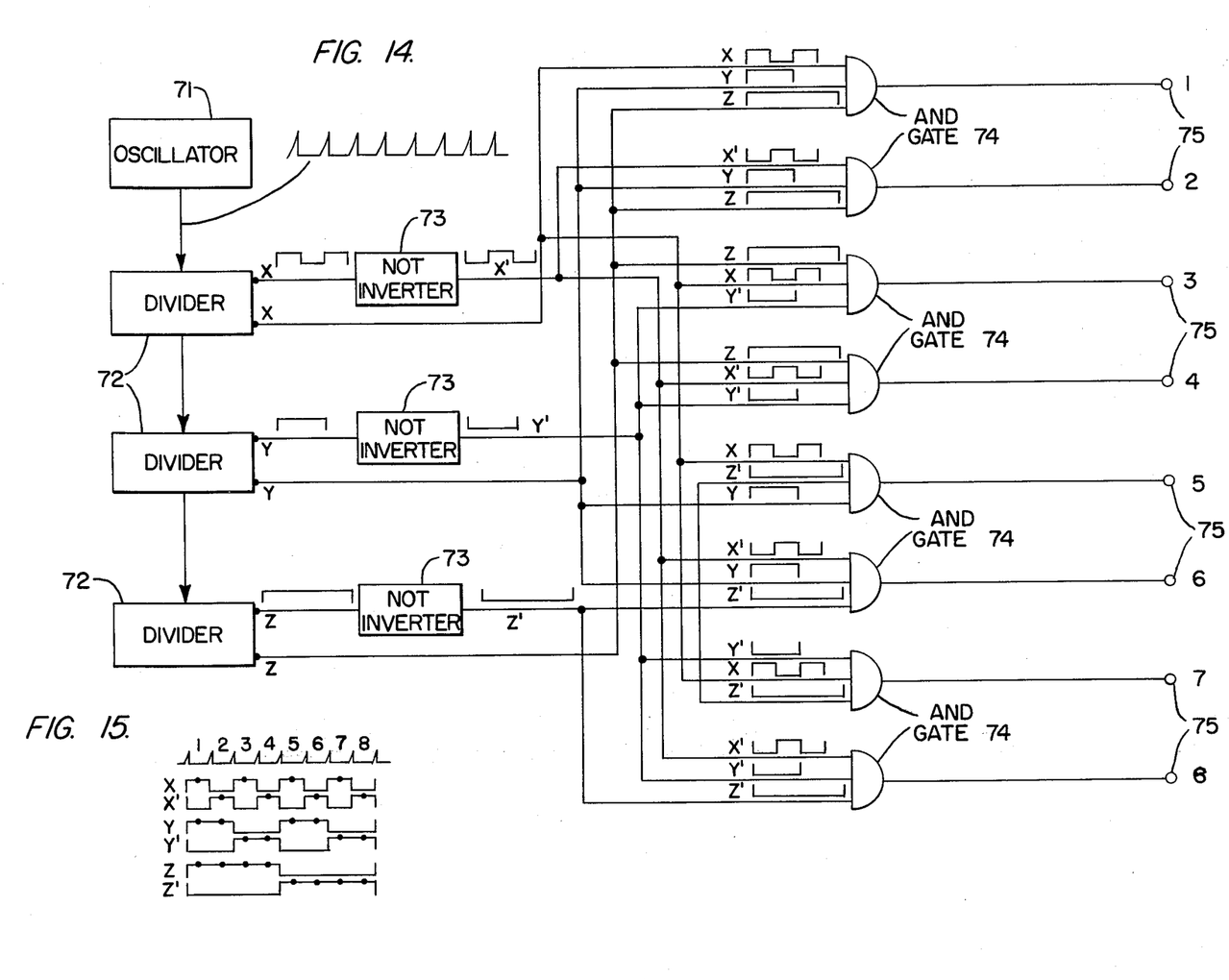
FIG. 14 is a circuit diagram of an alternate means of control of the lighting of the present invention.
FIG. 15 shows some ouput wave forms of dividers and inverters of FIG. 14.

Other forms of control of the lamps such as lamp 46 used with fiber optics or lamps 54 and 54' wherein fiber optics are not used, can be controlled by means other than motor and rotating arm as shown. One of such other means of control is through electronic circuity, such as, for example, that which is shown in FIG. 14. In this form of control an oscillator 71 feeds a series of pulses to dividers 72, each of which has a pulse form output sent through two outputs, one of each of which is fed through an inverter or NOT circuit 73. Pulses directly from the dividers and from the inverters are selectively fed to each of AND gates 74 and thence through gates 74 in sequence to light sources or lamps 75. Outputs of the dividers 72 and inverters 73 are shown diagrammatically in FIG. 15 with dots on the pulse forms to designate gating operation to channel power to each of eight designated lamp positions 75 in sequence and combinations triggering each of the AND gates 74. Thus such electronic circuitry may be used to control the lamps of the present invention or, in fact, any sequence generator may be substituted to perform electronically the control of sequential lighting of the lamps.

The optical metronome of the present invention moves a spot of light or a column of light behind the staff on the sheets of music. At some times the spot or column of light appears behind a point on the music sheet at which there is no musical notation. At such time this is merely an indication to the player of the instrument that the previous note is to be held for a duration of time until the spot or column of light again appears behind a following musical notation. Thus the device of the present invention is clearly able to define the note to be played and the duration of time for continuing that note while at the same time allowing the musician to pick up quickly at a point where he was previously stopped after a lapse of only a short interval of time due to simultaneous luminosity behind the sheets of music.

The sheets of music 22 used with the optical metronomes of the present invention differ from the sheets of music ordinarily encountered by the musician although having an appearance quite similar to those sheets. Not only must the size of the sheets be altered to fit the metronome face resulting in staves which may even be double the length of the staves of regular sheets of music but the beats per staff during which a light or lighted channel appears must be of a number compatible with the mechanism of the optical metronome. This involves new layout and redrawing of sheets of music to plan beats per staff for areas of luminosity to appear at each note or in spaces following where there is no note due to the music being played or timing variation among types of notes, and comparably the number of measures so as to have the exact number of beats which equals the number of channels or the number of lights in a horizontal line. Also such frames as are composed by brackets 25 must hold the sheet 22 flat in order to produce correct alignment between areas of luminosity and notes. Unlike regular sheets of music wherein alignment is not important but merely a matter of aesthetic taste, the devices of the present invention require properly drawn and aligned music sheets 22. The notes shown on music sheets 22 are merely for illustrative purposes and may not necessarily be drawn in all instances with spacing in conformance with the above explanation because of perspective viewing.

It would be obvious to those skilled in the art that various changes may be made without departing from the scope of the invention and the invention is not to be considered limited to the preferred embodiment or embodiments as shown in the drawings and described in the specification.

What is claimed is:

1. An optical metronome for visually indicating the note to be played and the duration of the note, on a sheet of music comprising
    a sheet of music designating a particular beat having parallel and vertically spaced staves thereon with measures drawn for timed relationship with each other,
    a body of the metronome having a face,
    holding means to hold said sheet of music on said face of said body,
    said body including
        an area of luminosity from behind said sheet of music visible therethrough with means to form said area of luminosity and space successive areas of luminosity relative to spacing of notes on said sheet of music, and
        means to move said area of luminosity in timed relation to the tempo of the music being played from said sheet of music along said staves on said sheet of music.

2. The optical metronome of claim 1, further characterized by
    said area of luminosity being a spot of illumination showing simultaneously on each of the staves of the sheet of music.

3. The optical metronome of claim 1, further characterized by
    said area of luminosity being a spot of illumination showing simultaneously in each of the measures of the sheet of music.

4. The optical metronome of claim 1, further characterized by
    said area of luminosity being in at least one column of illumination extending through all the staves on the sheet of music.

5. The optical metronome of claim 1, further characterized by
    said area of luminosity being a plurality of columns of illumination, each extending through all of the staves on the sheet of music and with each column in a separate measure of the top staff on the sheet of music.

6. The optical metronome of claim 2, further characterized by
    said means to form said area of luminosity being optical fibers between said area of luminosity and said moving means having ends extending to said face of said body.

7. The optical metronome of claim 6, further characterized by
    said moving means including
        a controllable speed motor,
        a rotatable disc mounted for rotation by said motor and having perforations therein equal to the number of different areas of simultaneous successive illumination,
        a plate adjacent said rotatable disc and having perforations therethrough into which ends of said optical fibers extend from the side of said plate opposite from the location of said rotatable disc, and
        a light source on the opposite side of said rotatable disc from said plate.

8. The optical metronome of claim 6, further characterized by
    said moving means including
        a controllable speed motor,
        an isolating plate having electrical contact sections therein equal in number to the number of different areas of successive illumination,
        a rotating arm and contact thereon mounted for contacting each of said electrical contact sections in turn during a rotation of said arm,
        lamps electrically connected to each of said electrical contact sections, and
        a plate adjacent said lamps and having perforations therethrough into which ends of said optical fibers extend from the side of said plate opposite from the location of said lamps.

9. The optical metronome of claim 4, further characterized by
    said moving means including
        a controllable speed motor,
        an isolating plate having electrical contact sections therein equal in number to the number of different areas of successive illumination,
        a rotating arm and contact thereon mounted for contacting each of said electrical contact sections in turn during a rotation of said arm,
        lamps electrically connected to each of said electrical contact sections,
        vertical channels mounted side by side behind the sheet of music positioned on said face of said body equal in number at least to the number of different areas of successive illumination, and
        at least one of said lamps positioned to light each of said channels.

10. The optical metronome of claim 9, further characterized by
    said vertical channels having reflecting means on their walls.

11. The optical metronome of claim 9, further characterized by
said at least one of said lamps positioned in said channel,
hinge means to move said lamps out of said channel so that the lamp may be accessible to be changed when necessary.

12. The optical metronome of claim 9, further characterized by
the number of said lamps connected to each of said electrical contact sections equal at least to the number of measures in a single staff on the sheet of music on said face of said body.

13. The optical metronome of claim 1, further characterized by
said moving means including
a plurality of lamps, and
electronic means to trigger said lamps successively.

14. The optical metronome of claim 13, further characterized by
said electronic means including
an oscillator means to trigger series of pulses,
divider means connected to said oscillator means to form different pulse forms,
inverter means connected to said divider means having outputs with pulse forms inverted from the pulse forms from said divider means,
a plurality of gating means connected to said divider means and said inverter means to be gated by combinations of pulse forms from said divider means and said inverter means,
and at least one of said plurality of said lamps connected to each of said gating means.

15. The optical metronome of claim 1, further characterized by
said sheet of music having thereon measures in each staff with beats equal in number to the total number of successive areas of luminosity appearing along each staff.

16. The optical metronome of claim 15, further characterized by
said sheet of music showing measures in each staff with notes of a numbered beat aligned with measures and notes of the same numbered beat in measures in vertically displaced staves.

17. The optical metronome of claim 1, further characterized by
said holding means including means to align said sheet of music with said area of luminosity.

* * * * *